US008232962B2

(12) United States Patent
Buck

(10) Patent No.: US 8,232,962 B2
(45) Date of Patent: Jul. 31, 2012

(54) SYSTEM AND METHOD FOR DISPLAY MANAGEMENT BASED ON USER ATTENTION INPUTS

(75) Inventor: Brian J. Buck, Lisle, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1039 days.

(21) Appl. No.: 10/872,617

(22) Filed: Jun. 21, 2004

(65) Prior Publication Data

US 2006/0037038 A1    Feb. 16, 2006

(51) Int. Cl.
*G06F 3/00* (2006.01)

(52) U.S. Cl. ......... 345/156; 351/209; 705/50; 705/7.29; 715/700

(58) Field of Classification Search .................. 345/156; 725/10, 110; 705/1
See application file for complete search history.

(56) References Cited

U.S. PATENT DOCUMENTS

| 5,220,361 | A |   | 6/1993  | Lehmer et al. |          |
|-----------|---|---|---------|---------------|----------|
| 5,339,392 | A |   | 8/1994  | Risberg et al.|          |
| 5,347,452 | A |   | 9/1994  | Bay, Jr.      |          |
| 5,471,542 | A |   | 11/1995 | Ragland       |          |
| 5,797,002 | A |   | 8/1998  | Patterson, Jr. et al. | |
| 5,831,594 | A | * | 11/1998 | Tognazzini et al. | 345/156 |
| 6,106,119 | A | * | 8/2000  | Edwards       | 351/209  |
| 6,134,535 | A |   | 10/2000 | Belzberg      |          |
| 6,272,474 | B1|   | 8/2001  | Garcia        |          |
| 6,577,329 | B1| * | 6/2003  | Flickner et al.| 715/774 |
| 6,608,615 | B1| * | 8/2003  | Martins       | 345/156  |
| 6,766,304 | B2|   | 7/2004  | Kemp, II et al.|         |
| 6,772,132 | B1|   | 8/2004  | Kemp, II et al.|         |
| 6,792,617 | B2| * | 9/2004  | Gorbatov et al.| 725/110 |
| 7,127,424 | B2|   | 10/2006 | Kemp, II et al.|         |
| 7,389,268 | B1|   | 6/2008  | Kemp, II et al.|         |
| 7,391,887 | B2| * | 6/2008  | Durnell       | 382/117  |
| 7,701,456 | B1| * | 4/2010  | Buck          | 345/440  |
| 8,117,102 | B1| * | 2/2012  | Buck          | 705/35   |
| 2001/0056391 | A1 |   | 12/2001 | Schultz   |          |
| 2002/0023038 | A1 |   | 2/2002  | Fritsch et al. |     |
| 2002/0039111 | A1 |   | 4/2002  | Gips et al.   |          |

(Continued)

OTHER PUBLICATIONS

U.S. Appl. No. 10/950,904, filed Sep. 27, 2004, Buck.

(Continued)

*Primary Examiner* — Grant Sitta
(74) *Attorney, Agent, or Firm* — McDonnell Boehnen Hulbert & Berghoff LLP

(57) ABSTRACT

A system and method are provided for managing data being displayed on at least one monitor screen based on monitoring user's attention in relation to the monitor screen. In one embodiment, upon detecting that the user's attention is leaving at least a portion of a screen, the system may alert the user of such an event. Alternatively, the system could alert the user upon detecting a triggering condition while the user's attention is away from the at least a portion of the screen. The step of alerting the user may include modifying at least a portion of a display on a monitor not being viewed by the user. Additionally, the system may initiate preparation of a report including any data not being viewed by a user during the time period when the user is not viewing a portion of the monitor.

28 Claims, 5 Drawing Sheets

U.S. PATENT DOCUMENTS

| | | | |
|---|---|---|---|
| 2002/0055899 A1 | 5/2002 | Williams | |
| 2002/0130858 A1 | 9/2002 | Perry et al. | |
| 2002/0130868 A1 | 9/2002 | Smith | |
| 2002/0161685 A1 | 10/2002 | Dwinnell | |
| 2002/0174199 A1* | 11/2002 | Horvitz | 709/220 |
| 2003/0009411 A1 | 1/2003 | Ram et al. | |
| 2003/0038754 A1* | 2/2003 | Goldstein et al. | 345/7 |
| 2003/0177085 A1 | 9/2003 | Buckwalter et al. | |
| 2004/0055447 A1 | 3/2004 | Childs, Jr. et al. | |
| 2004/0066414 A1* | 4/2004 | Czerwinski et al. | 345/781 |
| 2004/0070509 A1 | 4/2004 | Grace et al. | |
| 2004/0098462 A1* | 5/2004 | Horvitz et al. | 709/207 |
| 2004/0100467 A1* | 5/2004 | Heaton | 345/440 |
| 2004/0210504 A1 | 10/2004 | Rutman | |
| 2012/0109813 A1 | 5/2012 | Buck | |

OTHER PUBLICATIONS

Jereski, L. and Zweig, C., "The Mouse that Trades," *Forbes*, Oct. 28, 1991, p. 186.

International Search Report for PCT/US05/21700.

Definition of the term "period of time" Webpage [online], The Free Dictionary, Princeton University and Farlex, Inc., n. d., 2 pages. [Retrieved on May 10, 2012] from the Internet: http://www.thefreedictionary.com/period+of+time.

Definition of the term "substantial" Webpage [online], Free Merriam-Webster Dictionary, Merriam-Webster, Inc., 2012 2 pages. [Retrieved on May 10, 2012] from the Internet: http://www.merriam-webster.com/dictionary/substantial.

* cited by examiner

SYSTEM AND METHOD FOR DISPLAY MANAGEMENT BASED ON USER ATTENTION INPUTS

FIELD OF INVENTION

The present invention is directed to managing data displays. More specifically, the present invention is directed to managing data displays based on user's attention data.

BACKGROUND

An exchange is a central marketplace with established rules and regulations where buyers and sellers meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has advantageously led to, among other things, a more competitive market and greater liquidity.

With respect to electronic exchanges, buyers and sellers may log onto an electronic exchange trading platform by way of a communication link through their user terminals. Once connected, buyers and sellers may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

To profit in electronic markets, market participants must be able to assimilate large amounts of data in order to recognize market trends and to view current market conditions. Screen space is often an important factor for a trader to consider when he/she sets up a trading workstation, since the screen space directly affects the trader's ability to quickly view and process market data. Many traders use one large monitor running at a very high resolution in an effort to get the maximum amount of data onto the screen. However, in today's information-intensive markets, to be successful, traders often need to simultaneously view multiple trading interfaces, charts, industry news, spreadsheets, as well as other information. Since each application-created interface has at least one window, a single monitor does not allow a trader to simultaneously view data on multiple windows, and the time it takes the trader to flip between the windows does not make the single monitor the most optimal trading workspace solution.

Therefore, many traders use multiple monitors to avoid flipping from one window to another, and to efficiently view all windows simultaneously. However, traders with multiple monitors can actually only look closely at one monitor at a time. Although the human peripheral field of vision is 180°, the field of foveal vision (the region of the visual field where the user has the greatest visual activity) is approximately 2°. Therefore, a trader can only attend to a small part of each display at any one point in time. When a trader's gaze returns to a monitor after some period of time, it is simple to observe the current state of the application, but, especially with a real-time application like a trading interface or any other graphical display of time-varying data, it will not be easy for a trader to determine what has occurred during the time interval when the trader was looking elsewhere. As a trader uses more monitors, the trader may miss many important trading opportunities by not being able to simultaneously view data that are displayed on different monitors. Therefore, it would be beneficial to provide a system that could be used by a trader to improve his awareness of market events when the trader is using more than one monitor.

BRIEF DESCRIPTION OF THE DRAWINGS

Example embodiments of the present invention are described herein with reference to the following drawings, in which.

DETAILED DESCRIPTION

Figure 1:
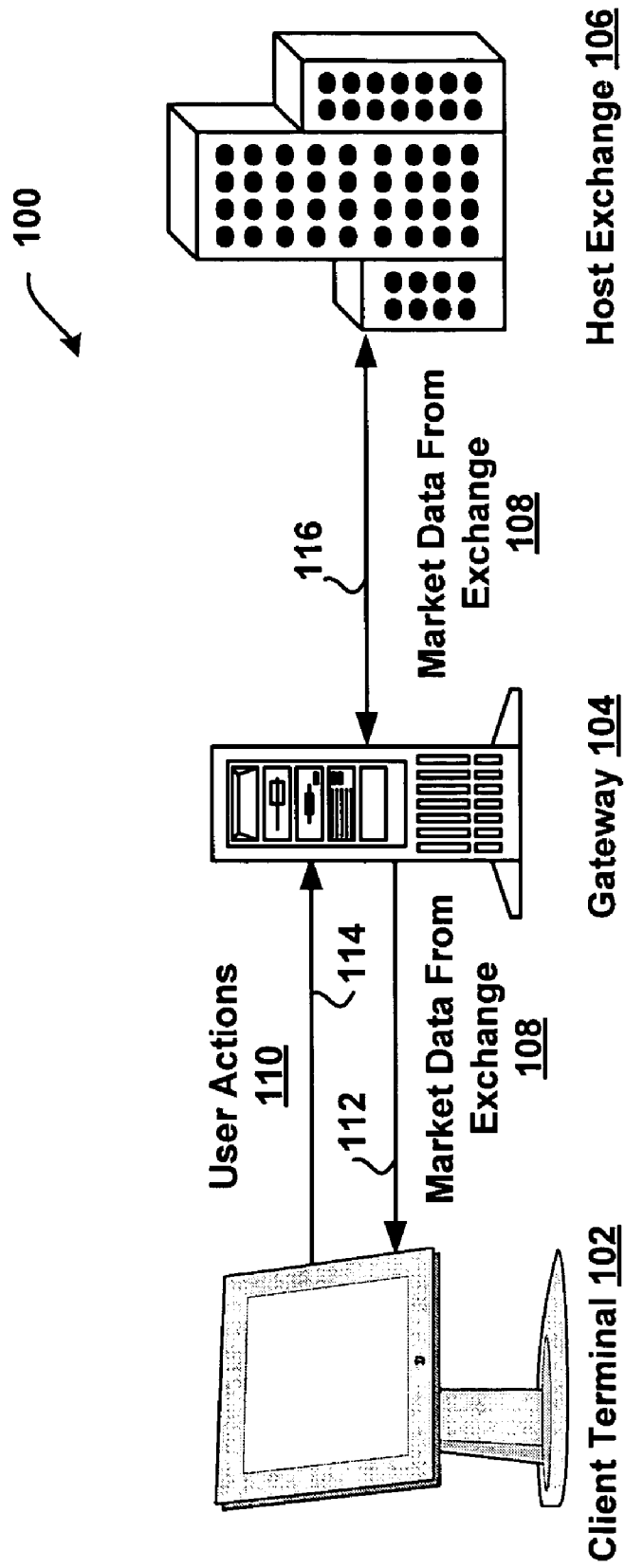
FIG. 1 is a block diagram illustrating an example network configuration for a communication system utilized to access one or more exchanges.

I. Display Management Using Gaze Input Controls

The preferred embodiments are provided, among other things, to facilitate display management based on monitoring user's attention in relation to one or more display monitors, such as monitoring a user's gaze position in relation to one or more monitors, or upon detecting some other user-defined events. In one aspect of the preferred embodiments, a system includes, among other elements, a plurality of monitors, one or more gaze tracking units, and a display manager application. The gaze tracking units preferably non-intrusively capture the direction of the user's gaze and calculate which screen or which portion of the screen the user is currently viewing. If one of the gaze tracking units detects the user shifting his eyes away from a monitor or from one or more graphical interfaces being displayed on the monitor, the gaze tracking unit may notify the display manager application of the occurrence of such an event, and the display manager application can responsively start managing at least a portion of the display monitor.

In one preferred embodiment, the display manager application may record data being displayed on the monitor while the user's gaze is away from the monitor. In such an embodiment, for example, the data can be recorded during the entire trading session, and the display manager application can select or mark portions of the data being recorded so that the data corresponding to the time when the user's gaze was away from the screen or a portion thereof can be later easily identified. Alternatively, the display manager application may modify the display, such as suppress or minimize some or all of the displayed windows, or perform different functions based on the user's preferences. Then, when the gaze tracking unit detects the user's gaze returning back to the monitor, an event indicating that marking of the data being recorded should stop, the gaze tracking unit may notify the display manager application to stop marking the data that is being recorded. Alternatively, if the display manager application starts data recording upon detecting that the user's gaze is away from the monitor, or a portion thereof, the event of the user's gaze returning back to the monitor can be interpreted as a request to stop recording. In one embodiment, the display manager application may prepare a report including events that happened during the time period when the user's gaze was away from the monitor, and may provide the report to a user upon detecting another event, such as upon detecting the user's gaze returning back to the monitor. The report could include a series of snapshots of textual and/or graphical displays, or may include all recorded data which can be later played to a user. Also, the report could highlight certain elements on the user interfaces while the user's gaze was away from the monitor. In another embodiment, the report could be a "weather map" style fast forward display of what happened during the away time. However, it should be understood that different report formats could also be prepared based on the user's preferences.

In an alternative embodiment, or in addition to preparing a report, the display manager application could also alert a user at times when the user is not looking at a monitor or at one or more windows being displayed on the monitor. In one embodiment, the process of alerting a user may include modifying a full display monitor or portions of the display, such as individual windows, not being viewed by the user. For example, the display manager application could modify the display by enhancing, enlarging, or modifying colors of the windows or interfaces not being viewed by a user. However, it should be understood that different modifications could be applied to the individual windows or entire monitor displays as well. Also, rather than enhancing the display of the windows not being viewed by the user, such windows could be minimized or covered with some other displays. Further, alternatively, the alerts could be audio alerts, and could include any audio messages or sounds. In such an embodiment, the content of audio messages could be based on what a user is not looking at on one or more screens. Alternatively, alerts could only be provided to a user upon detecting a condition triggering generation of an alert. It should be understood that such conditions could be user configurable.

While the present invention is described herein with reference to illustrative embodiments for particular applications, it should be understood that the present invention is not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the present embodiments may be operated in an entirely software embodiment, in an entirely hardware embodiment, or in a combination thereof. However, for sake of illustration, the preferred embodiments are described in a software-based embodiment, which is executed on a computer device. As such, the preferred embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

In an electronic trading environment, when a trader selects a tradeable object, the trader may access market data related to the selected tradeable object(s). Referring to FIG. 1, an example communication that might occur between an electronic exchange and a client terminal in accordance with the preferred embodiments is shown. During a trading session, market data 108, in the form of messages, may be relayed from a host exchange 106 over communication links 116 and 112 to a client terminal generally indicated as 102. As illustrated in FIG. 1, intermediate devices, such as gateway(s) 104, may be used to facilitate communications between the client terminal 102 and the host exchange 106. It should be understood that while FIG. 1 illustrates the client terminal 102 communicating with a single host exchange, in an alternative embodiment, the client terminal 102 could establish trading sessions to more than one host exchange.

The market data 108 contains information that characterizes the tradeable object's order book including, among other parameters, order related parameters, and the inside market, which represents the lowest sell price (also referred to as the best or lowest ask price) and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, an opening price, last traded price, last traded quantity, the closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client terminal 102. Upon viewing the market information or a portion thereof, a trader may wish to take actions, such as send orders to an exchange, cancel orders at the exchange, or change order parameters, for example. To do so, the trader may input various commands or signals into the client terminal 102. Upon receiving one or more commands or signals from the trader, the client terminal 102 may generate messages that reflect the actions taken, generally shown at 110. It should be understood that different types of messages or order types can be submitted to the host exchange 106, all of which may be considered various types of transaction information. Once generated, user action messages 110 may be sent from the client terminal 102 to the host exchange over communication links 114 and 116.

III. System Function and Operation

Figure 2:
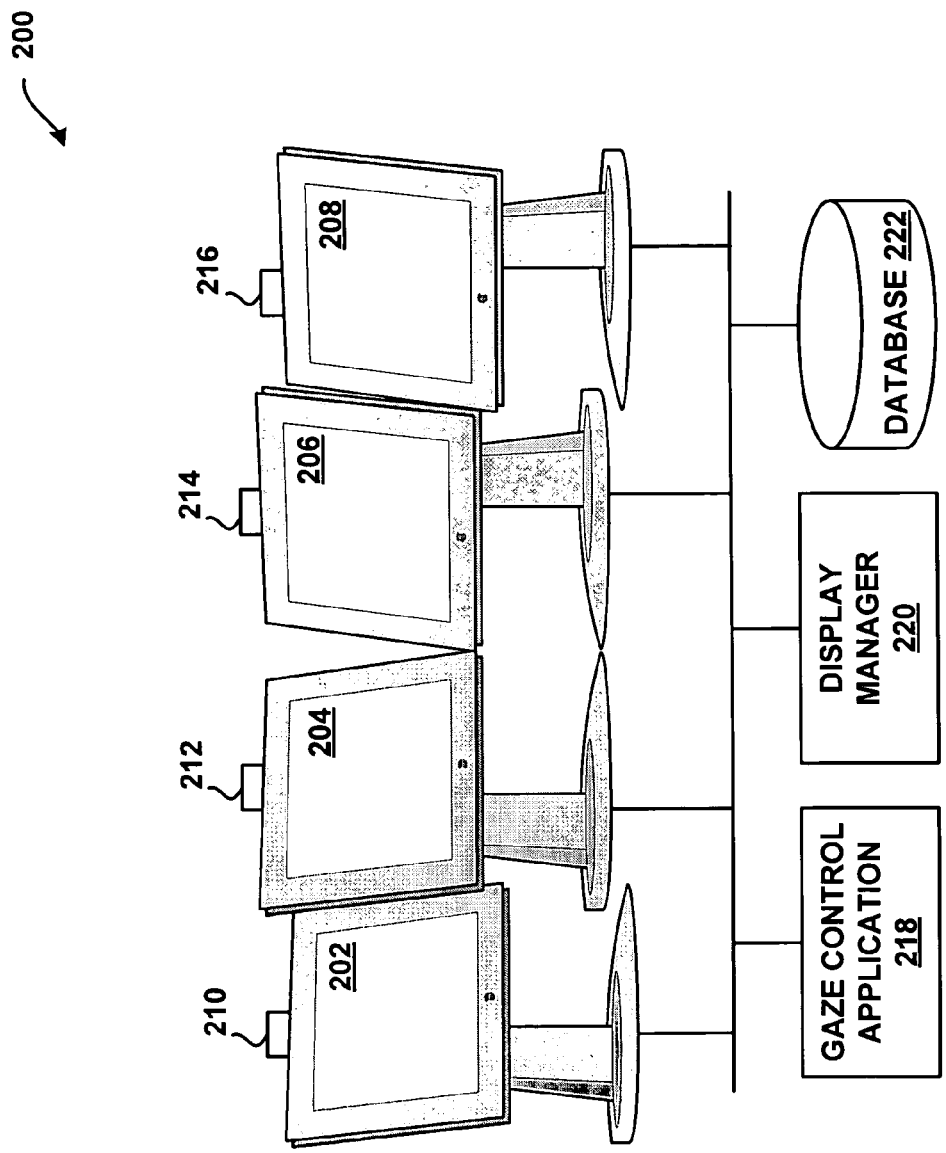
FIG. 2 is a block diagram illustrating an example system for management of market data being displayed on multiple monitors using gaze tracking in a trading environment.

FIG. 2 is a block diagram illustrating an example system 200 for management of market data displays on multiple monitors using gaze tracking inputs according to one example embodiment. The system 200 includes a plurality of computer display units or screens 202-208, each associated with gaze tracking interfaces 210-216 for following and tracking positions and movements of the user's head and eyes. There are many currently existing technologies providing gaze detection and tracking functionality, and the gaze tracking interfaces 210-216 can include any existing or later developed gaze detection and tracking systems. According to one preferred embodiment, the gaze tracking interfaces 210-216 may capture the user's gaze, and then provide the user's gaze position data to a gaze control application 218. FIG. 2 illustrates each monitor having a gaze tracking interface. However, in an alternative embodiment, the system 200 could include a single gaze tracking interface to monitor a user's gaze in relation to a plurality of monitors. Also, it should be understood that the embodiments described herein are not limited to any number of monitors or gaze tracking interfaces, and fewer or more monitors and gaze tracking interfaces could also be used.

Upon receiving the user's gaze position data, the gaze control application 218 may first determine the user's gaze position coordinates in relation to one of the monitors. When the gaze control application 218 detects a user shifting his eyes away from one of the monitors (or a portion of a display on one of the monitors, depending on the user's preferences), the gaze control application 218 may provide a signal to the display manager 220 so that, in one preferred embodiment, the display manager 220 may start preparing a report of events occurring while the user is not looking at the monitor. It should be understood that the report may take many different formats, and may include textual and/or graphical data. Also, in a preferred embodiment, a user may specify a number of rules defining which portions of the displayed interfaces should be recorded. For example, if a monitor displays a trading interface and a chart, a user may wish to configure a number of rules that will cause the display manager 220 to only record data being displayed on the trading interface, while not recording any chart display data.

In a preferred embodiment, the display manager 220 may continue preparation of the report until the gaze control application 218 provides a stop signal to the display manager 220. The gaze control application 218 may generate the stop signal upon detecting that the user's gaze returned to the monitor. The display manager 220 may then provide the generated report to a user. It should be understood that the report could be displayed to a user immediately upon detecting the user's gaze returning back to the monitor for which the report was created. Alternatively, a user may control when he/she wishes to view the report. As mentioned in earlier paragraph, the report may take many different formats, and may include a series of textual and/or graphical displays, highlighting of certain elements on the application's user interface, a fast forward display of what happened during the away time, a combination thereof, or yet some other format. It should be understood that a user could define a number of rules to be used by the display manager 220 to prioritize which of the recorded data should be shown to the trader first. In such an embodiment, the display manager 220 may process data from many applications or windows, and may report the highest priority items first. The display manager 220 may then save each report in a database 222.

In the system 200 illustrated in FIG. 2, the display manager 220 is connected to multiple monitors that are part of a workspace. However, alternatively, the display manager 220 could also control monitors connected to more than one workstation. In such an embodiment the display manager 220 may communicate over a network with the gaze tracking interfaces associated with other workspaces, and can mediate the reporting process over one or more networks.

Also, while FIG. 2 and subsequent figures refer to using gaze related data, the preferred embodiments are not limited to monitoring where the user is looking. Alternatively, the display manager 220 can perform its functions in response to other user attention based inputs. For example, the display manager 220 could manage the display according to the preferred embodiments described below when it detects that a portion or the entire window being displayed on a monitor is covered by another window so that a user cannot view the window underneath. However, it should be understood that different events could also be considered to affect the user's attention.

Figure 3:
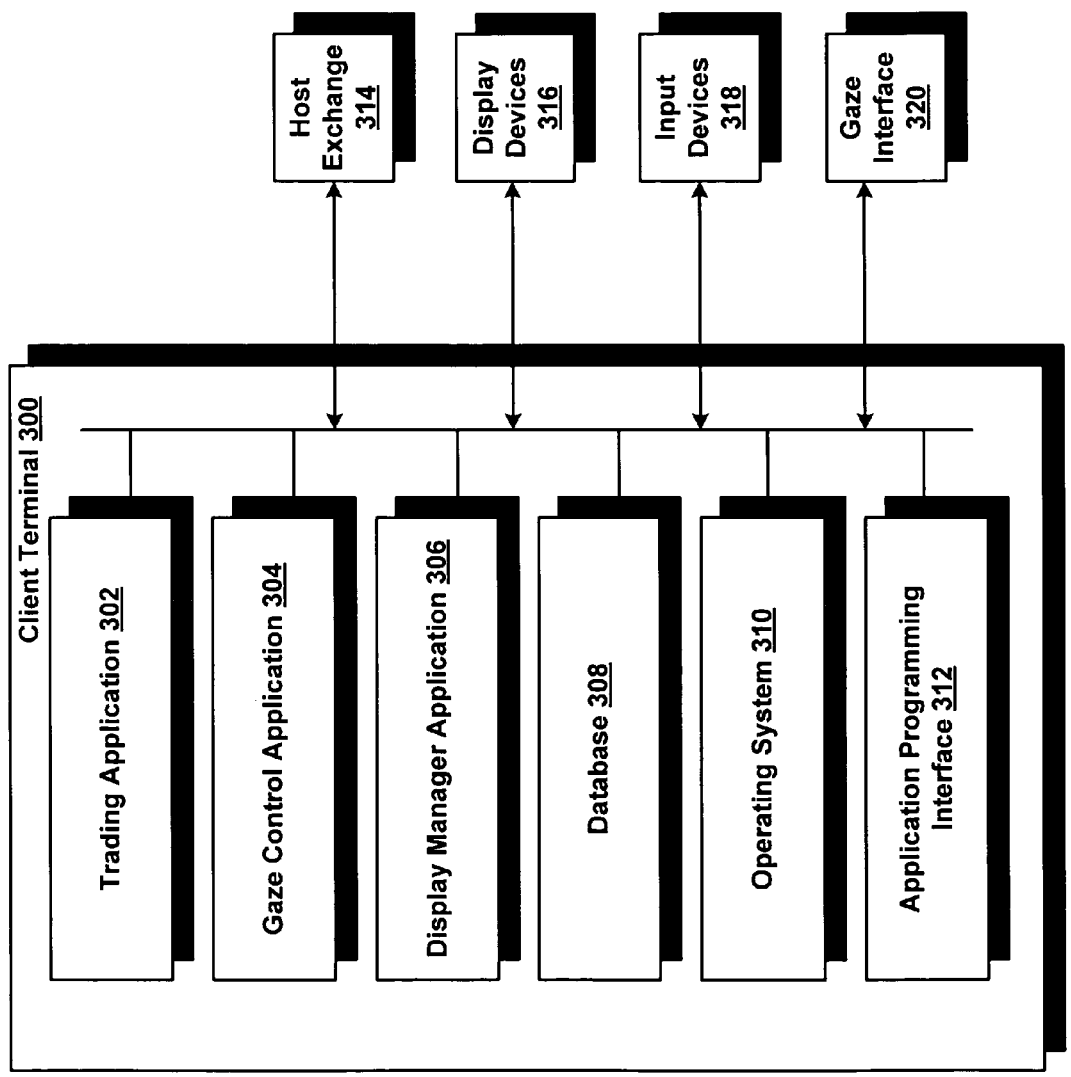
FIG. 3 is a block diagram of a client device with a number of layers defining different stages that can be used to implement the example embodiments.

FIG. 3 is a block diagram illustrating a client device 300 with a number of layers defining different stages that may be used to implement embodiments of the present invention. The layers include a trading application 302, a gaze control application 304, a display manager application 306, a database 308, an operating system 310, and an application programming interface ("API") 312. The client device 300 also preferably includes, among other things, at least a processor and a memory unit (both of which are not shown in the figure, but are well known computer components). Preferably, the processor has enough processing power to handle and process various types of market information. Therefore, the more market information is received and processed, the more processing power is preferred. However, any present day processor has enough processing power to handle and process various types of market information. Also, it should be understood that memory may include any computer readable medium. The term computer readable medium, as used herein, refers to any medium that participates in providing instructions to a processor unit for execution.

Preferably, the trading application 302 and the display manager applications 306 have access to market information from one or more host exchange 314 through an interface, such as the API 312. A commercially available trading application that allows a user to trade is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage, and display functions.

Portions of the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. patent application Ser. No. 10/125,894, entitled "Trading Tools for Electronic Trading," filed on Apr. 19, 2002, the contents of each are incorporated herein by reference.

When the gaze control application 304 receives user's gaze position data from a gaze interface 320, the gaze control application 304 may determine position coordinates of the user's gaze in relation to one or more monitors in a user's workspace. Upon detecting that the user has shifted his eyes away from one of the monitors, the gaze control application 304 may provide a signal to the display manager application 306 to start managing the display of the monitor. The display manager application 306 may start recording market data or any other data being displayed on the monitor while the user is not looking at the monitor. Alternatively, the display manager application 306 may suppress the active display of the monitor by minimizing any windows that are displayed on the monitor, or by obscuring the windows with a snapshot of what the display looks like at various intervals. However, it should be understood that any other mechanism, such as intercepting low-level window manager messages related to commands to paint the physical screen, could be used as well to modify a display while a user is not looking at a monitor. Also, in one preferred embodiment, the process of updating the monitor display preferably resumes immediately upon detecting the user's eyes returning back to the monitor. In fact, the display manager application 306 could stop management of the display as soon as the gaze interface 320 detects that there is a reasonable probability of the gaze coming to rest upon the display monitor in question.

Preferably, any data recorded by the display manager application 306 may be saved in the database 308. The database 308 may be any data storage entity that provides writing and reading access. In one preferred embodiment, the database 308 may record any data for the display manager application 306, and the data could be recorded directly to a memory unit or to some other storage device, such as a computer's hard disk. The display devices 316 could be CRT-based video displays, LCD-based displays, gas plasma-panel displays, displays that show three-dimensional images, different display types, or the combination thereof. The input devices 318 may include a mouse, a keyboard, a game pad, or a stylus in the embodiments using touch-screen display devices. However, different input devices could also be used.

The operating system 310 may be used to manage hardware and software resources of the client terminal 300. General functions of the operating system 310 may include processor management, memory management, device management, storage management, application interface, and user interface. Any type of the operating system 310 may be used to implement the present embodiments, and examples of common operating systems include the Microsoft WINDOWS family of operating systems, the UNIX family of operating systems, or the MACINTOSH operating systems. However, those ordinarily skilled in the art will recognize that the added complexity of an operating system may not be necessary to perform the functions described herein.

Figure 4A:
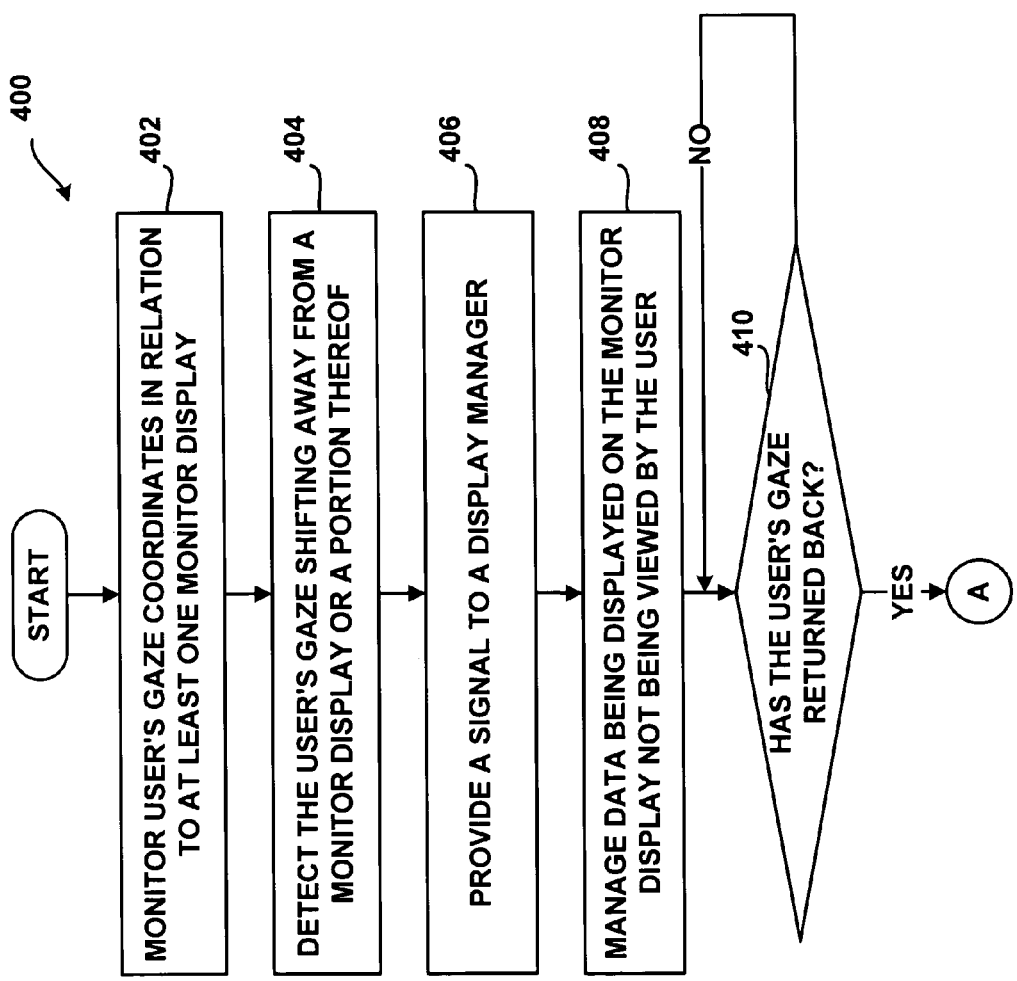
FIGS. 4A and 4B are a flow diagram illustrating operation and function of a possible implementation of the preferred embodiments for managing multiple monitor displays according to one example embodiment.
Figure 4B:
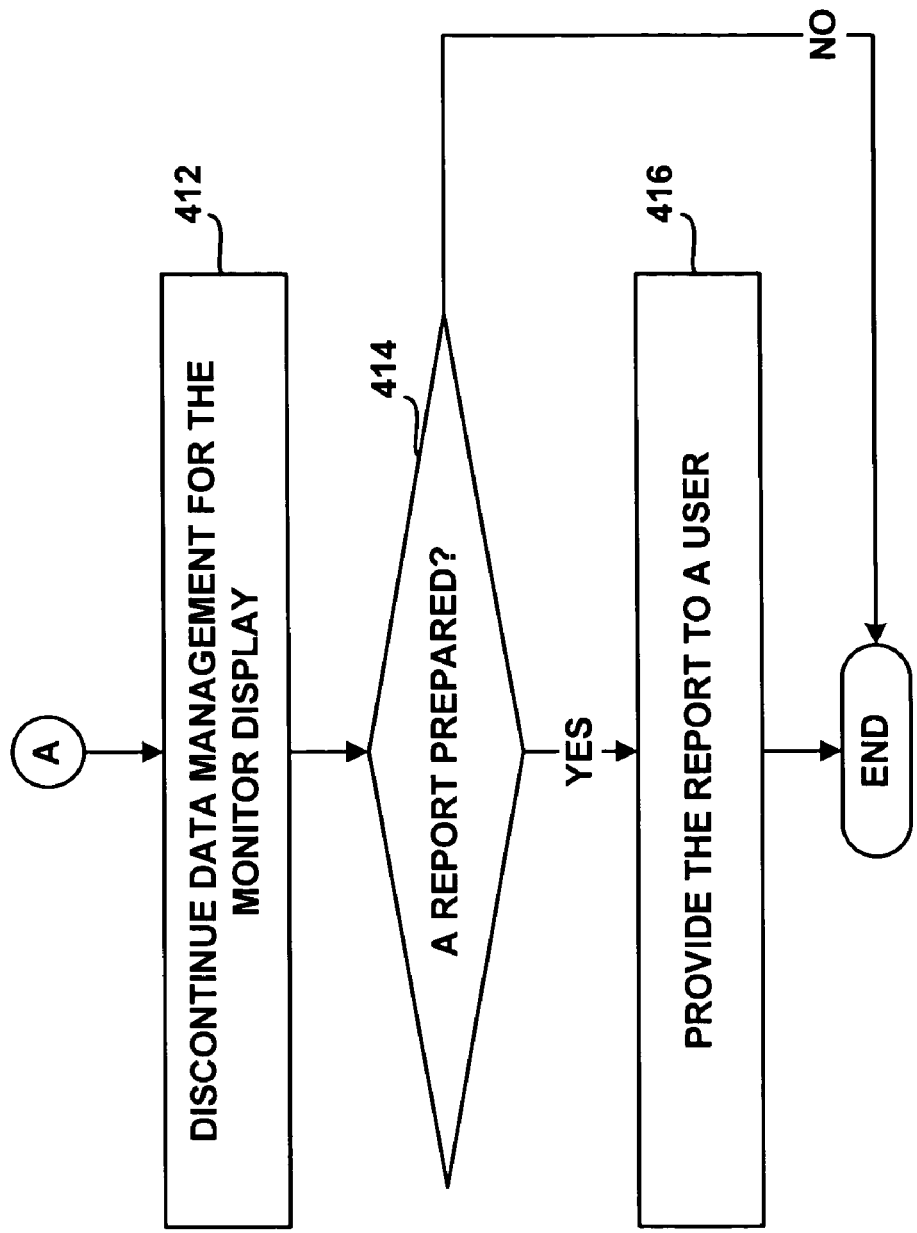

FIGS. 4A and 4B are a flow chart illustrating a method 400 for operation and function of a gaze control application of the preferred embodiments for gaze control processing. It should be understood that each block may represent a module, segment, or portions of code, which includes one or more executable instructions for implementing specific logical functions or steps in the process. Alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. The flow diagram 400 will be described in relation to the elements of the client terminal in FIG. 3. However, it should be understood that more, fewer, or different components could also be used to execute the method 400.

Referring to FIG. 4A, at step 402, the gaze control application 304 uses inputs that are provided by the gaze interface 320 to determine and monitor coordinates of the user's gaze in relation to at least one monitor. In a preferred embodiment, the gaze control application 304 uses the gaze coordinates to determine the exact position of the user's eyes in relation to one of the monitors. At step 404, the gaze control application 304 detects the user's eyes shifting away from at least one monitor display. It should be understood that, in an alternative embodiment, the gaze control application 304 could be also configured to detect the user's eyes shifting away from one or more windows or user interfaces being displayed on a monitor. Also, alternatively, events other than the user's gaze shifting away from the screen or a portion thereof could be detected as well, and could trigger the steps of the method described below. Such events, for example, may include any user's attention based events, such as a window being temporarily obscured by another window, or some other user-configurable events.

When the gaze control application 304 detects that the user's eyes has shifted away from one of the monitors or a portion thereof, such as from one or more windows being displayed on the monitor, at step 406, the gaze control application 304 may provide a signal to the display manager application 306. In one embodiment, the signal may include an identifier defining a monitor, or one or more application windows that are not being viewed by the user. It should be understood that the user could define which of the application windows or monitors should be monitored by the gaze control application 304 so that the gaze control application 304 would provide a signal to the display manager application 306 only when it detects the user's eyes shifting away from one of the specified application windows or monitors.

At step 408, the display manager application 306 may start management of data being displayed on the monitor. In one preferred embodiment, the display manager application 306 may prepare a report by recording data being displayed on the monitor while the user's eyes are away from that monitor. For example, the system may be configured to record data being displayed on a monitor during the entire trading session. In such an embodiment, the display manager application 306 may record the time when the user's gaze shifts away from the monitor or a portion thereof so that it can later go back to the recording and identify the start of the relevant data. It should be understood that different methods could also be used to identify where the relevant data has started. In an alternative embodiment, the display manager application 306 could start recording the data at the time when the gaze control application 304 detects the user's gaze shifting away from the monitor or a portion thereof.

In an alternative embodiment, the display manager application 306 may initiate a process of alerting a user upon detecting that the user's gaze has shifted away from the monitor or from one or more windows being displayed on the monitor. For example, the display manager application 306 could enhance, enlarge, or change colors of all or some windows or interfaces not being viewed by the user. Further, alternatively, the display manager application 306 could minimize some windows being displayed on the monitor, or could cover some or all windows not being viewed by a user with some other windows. Also, the process of alerting a user could include providing audio alerts, such as playing messages or different sounds to a user. In such an embodiment, the message content or the type of the alert used may depend on data not being viewed by a user at one of the monitors or portions of the monitor. Also, it should be understood that the process of alerting a user may be initiated at the time when the user shifts his attention from the monitor or the window, or at some other time, such as upon detecting an alert triggering condition along with the user's attention being away from a monitor or from a window.

At step 410, the gaze control application 306 determines if the user's gaze has returned back to the monitor or to one or more windows being displayed on the monitor. Referring to FIG. 4B, when the user's gaze returns back to the monitor or windows being displayed on the monitors, at step 412, the display manager application 306 may discontinue data management for the monitor display. For example, the display manager application 306 may record the time when the event happened so that it can later identify the end of the relevant data from the recorded data. In an alternative embodiment where the display manager application 306 only starts recording data upon detecting a user attention based event, the display manager application 306 may stop recording upon detecting the user's gaze returning back to the monitor. Further, alternatively, the display manager application 306 could discontinue generating alerts for a user in relation to windows or the monitor being currently viewed by the user, or may stop modifying the display of the monitor or the windows.

At step 414, the display manager application 306 may determine if a report was prepared for a user. As explained in reference to earlier paragraphs, in a preferred embodiment, the report may include all or some data recorded during the time interval when the user's gaze was away from the monitor, or away from one or more windows on the monitor. Also, it should be understood that the report may take many different formats. For example, the report could be a series of textual and/or graphical displays of what happened during the user's away time. Alternatively, the report could include a series of screen/window snapshots, or video data highlighting certain elements on the user interfaces during the user's away time. Also, a user could control which of the displayed data should be recorded, or what events should trigger the process of recording data. It should be understood that any combination of report types could be used, or yet some other report type could also be generated.

If the report has been generated, at step 416, the display manager application 306 provides the report to a user. In one embodiment, the display manager application 306 may provide to the user the fast forward style of display of what happened during the away time period so that the user could control how quickly he reviews the data in the report. However, it is possible that the user's eyes may quickly shift to another display while the user is viewing the report, only to shift back again to the original or yet another display. In such an embodiment, the display manager application 306 may note that there has not been sufficient time to report to the user all actions that occurred during the time interval when the user's gaze was away from the monitor or one or more windows on the monitor, and may keep that information stored for later reporting. Optionally, the display manager application 306 can require an acknowledgement of the reported information, such as by an action the user may take with an input device, or by detecting that the user had a sufficient time to view the reported items. In another embodiment, if there is not enough space on a screen to display the report without obscuring other windows, the display manager application 306 could display a report data window on top of one or more other windows. In such an embodiment, any data displayed via the report data window can be transparent so that a user can view both the report data as well as any other data being displayed on the underlying windows.

Alternatively, rather than waiting for the user's gaze to return back to the monitor, the user may opt to view the generated report via another device while the user is away from the location of the monitors. As an example, the user could view the report via a wireless device that is capable of receiving and displaying to the user snapshots of information being received from the display manager application 306.

In another preferred embodiment, the display manager application 306 could operate in conjunction with another display data application. In such an embodiment, the display manager application 306 may notify the display data application of the event that the recording should begin, such as upon detecting a user's gaze shifting away from a monitor or a portion thereof, as in the embodiment described in reference to FIGS. 4A and 4B, or upon detecting some other event, such as a window being covered by other interfaces. Later, the display manager application 306 could notify the display data application of another event indicating that the display data application should preferably stop recording. Then, the display manager application 306 could provide another signal upon detecting the occurrence of an event that a report should be prepared and provided to a user. However, it should be understood that still different embodiments could be possible as well.

While the above embodiments described the display manager application 306 preparing a report or modifying a display of a monitor while the user's gaze is away from the monitor, different embodiments are possible as well. For example, the display manager application 306 managing a monitor that is not being attended by a user may encounter an event of such a high priority that it might notify the user right away. In one embodiment, because the display manager application 306 continuously receives user's gaze position data from the gaze control application 304, it may at any time determine the current position of the user's gaze based on the received data. Knowing the current user's gaze position, the display manager application 306 may place notifications of appropriate severity within the edges of the user's current field of view, preferably without obscuring the interface that is central to the user's gaze, yet still be able to attract the user's attention. For example, the notification could include textual and/or graphical information, depending on the user's preferences. Also, any alert signals could be an audio signal. In one embodiment, the notification displayed to the user could include portions of the application window not being viewed by the user, so that the user could also interact with the application window if he wishes to do so, and not just read or become aware of the past activity. Alternatively, based on the user's preferences, the notification could include the application window in its entirety.

In addition to monitoring the user's gaze, the gaze control application 304 could also use other events as triggers to start managing displayed data according to the preferred embodiments. For example, the events may include an action of minimizing one or more application windows, or detecting that a window is obscured by another window, thus, effectively preventing a user from viewing any data being displayed on the window. In an embodiment where the display manager 306 prepares a report, the display manager application 306 may consider the event of restoring the window or the window becoming again visible on the screen as a signal to stop recording data being displayed via that window. Upon detecting either of the events above, the display manager application 306 may provide a report to the user, and the report may include significant events that occurred since the last time the user saw the window, or otherwise summarize the activity that has taken place when the window was minimized or obstructed by another window.

In further alternative embodiment, risk managers could use the system and methods described above to receive information related to activities of several traders. For example, a display manager application running on a computer of a risk manager may be configured to receive information from display manager applications of the individual traders, and may alert the risk manager when one or more preconfigured alert conditions are detected based on the received data from one or more traders. In such an embodiment, the risk manager could view summary reports describing each user's activities, snapshots of displays corresponding to one or more of the user's monitors, or even full videos of actual users during a specific timeframe, along with information defining where the user's eyes were fixed during that time. However, it should be understood that different embodiments are possible as well.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for display management using gaze control inputs or any other user attention based inputs may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention clamed is:

1. A method including:
   receiving by a computing device real-time market data related to a tradeable object listed by an electronic exchange;
   displaying by the computing device a trading application interface to a user on a display unit, wherein the trading application interface is generated based at least in part on the real-time market data being received;
   detecting by the computing device that the user's attention has shifted away from the trading application interface based at least in part on monitoring the user's gaze in relation to the trading application interface;
   starting by the computing device a recording of the real-time market data being received, wherein the recording is started in response to detecting that the user's attention has shifted away from the trading application interface, wherein the trading application interface continues to be updated with the real-time market data being received by the computing device while the user's attention has shifted away from the trading application interface;
   detecting by the computing device that the user's attention has shifted back to the trading application interface subsequent to detecting that the user's attention has shifted away from the trading application interface;
   stopping by the computing device the recording of the real-time market data being received, wherein the recording is stopped in response to detecting that the user's attention has shifted back to the trading application interface;
   identifying by the computing device one or more a plurality of events based on the recording of the real-time market data received while the user's attention was shifted away from the trading application interface;
   generating by the computing device a report including the one or more identified events; and
   displaying by the computing device the report to the user.

2. The method of claim 1, wherein detecting that the user's attention has shifted away from the trading application interface includes determining whether the user's gaze is shifted away from the display unit.

3. The method of claim 1, wherein detecting that the user's attention has shifted back to the trading application interface includes determining whether the user's gaze is shifted back to the display unit.

4. The method of claim 1, wherein the trading application interface is continuously displayed while the user's attention is shifted away from the trading application interface.

5. The method of claim 1, wherein at least one of the one or more events is identified based on a user-configured rule.

6. The method of claim 1, wherein the report includes at least one of textual data, audio data, video data, and graphical data.

7. The method of claim 1, wherein the report includes a snapshot of the displayed trading application interface at a time associated with one of the one or more events.

8. The method of claim 1, wherein the report is displayed to the user in a fast forward style of display.

9. The method of claim 1, wherein the report is displayed to the user in response to detecting that the user's attention has shifted back to the trading application interface.

10. The method of claim 1, wherein the report is displayed to the user in response to a request from the user.

11. The method of claim 1, wherein identifying the one or more events starts in response to detecting that the user's attention has shifted away from the trading application interface.

12. The method of claim 1, wherein identifying the one or more events starts in response to detecting that the user's attention has shifted back to the trading application interface.

13. The method of claim 1, wherein generating the report starts in response to detecting that the user's attention has shifted away from the trading application interface.

14. The method of claim 1, wherein generating the report starts in response to detecting that the user's attention has shifted back to the trading application interface.

15. A non-transitory computer readable medium having stored therein instructions executable by a processor, wherein the instructions are executable to:
   receive real-time market data related to a tradeable object listed by an electronic exchange;
   display a trading application interface to a user on a display unit, wherein the trading application interface is generated based at least in part on the real-time market data being received;
   detect that the user's attention has shifted away from the trading application interface based at least in part on monitoring the user's gaze in relation to the trading application interface;
   start a recording of the real-time market data being received, wherein the recording is started in response to detecting that the user's attention has shifted away from the trading application interface, wherein the trading application interface continues to be updated with the real-time market data being received by the computing device while the user's attention has shifted away from the trading application interface;
   detect that the user's attention has shifted back to the trading application interface subsequent to detecting that the user's attention has shifted away from the trading application interface;
   stop the recording of the real-time market data being received, wherein the recording is stopped in response to detecting that the user's attention has shifted back to the trading application interface;

identify one or more events based on the recording of the real-time market data received while the user's attention was shifted away from the trading application interface;

generate a report including the one or more identified events; and display the report to the user.

16. The computer readable medium of claim 15, wherein the instructions to detect that the user's attention has shifted away from the trading application interface include instructions executable to determine whether the user's gaze is shifted away from the display unit.

17. The computer readable medium of claim 15, wherein the instructions to detect that the user's attention has shifted back to the trading application interface include instructions executable to determine whether the user's gaze is shifted back to the display unit.

18. The computer readable medium of claim 15, wherein the trading application interface is continuously displayed while the user's attention is shifted away from the trading application interface.

19. The computer readable medium of claim 15, wherein at least one of the one or more events is identified based on a user-configured rule.

20. The computer readable medium of claim 15, wherein the report includes at least one of textual data, audio data, video data, and graphical data.

21. The computer readable medium of claim 15, wherein the report includes a snapshot of the displayed trading application interface at a time associated with one of the one or more events.

22. The computer readable medium of claim 15, wherein the report is displayed to the user in a fast forward style of display.

23. The computer readable medium of claim 15, wherein the report is displayed to the user in response to detecting that the user's attention has shifted back to the trading application interface.

24. The computer readable medium of claim 15, wherein the report is displayed to the user in response to a request from the user.

25. The computer readable medium of claim 15, wherein the instructions to identify the one or more events start in response to detecting that the user's attention has shifted away from the trading application interface.

26. The computer readable medium of claim 15, wherein the instructions to identify the one or more events start in response to detecting that the user's attention has shifted back to the trading application interface.

27. The computer readable medium of claim 15, wherein the instructions to generate the report start in response to detecting that the user's attention has shifted away from the trading application interface.

28. The computer readable medium of claim 15, wherein the instructions to generate the report start in response to detecting that the user's attention has shifted back to the trading application interface.

* * * * *